US006782401B2

(12) United States Patent
Winokur

(10) Patent No.: US 6,782,401 B2
(45) Date of Patent: Aug. 24, 2004

(54) METHOD AND APPARATUS FOR IMPLEMENTING A RELIABLE OPEN FILE SYSTEM

(75) Inventor: Alexander Winokur, Haifa (IL)

(73) Assignee: Sepaton, Inc., Southborough, MA (US)

( * ) Notice: Subject to any disclaimer, the term of this patent is extended or adjusted under 35 U.S.C. 154(b) by 366 days.

(21) Appl. No.: 09/896,998

(22) Filed: Jul. 2, 2001

(65) Prior Publication Data

US 2003/0004972 A1 Jan. 2, 2003

(51) Int. Cl.[7] .................................................. G06F 12/00
(52) U.S. Cl. ........................... 707/201; 707/205; 707/2; 707/3; 707/101; 707/102
(58) Field of Search ................................. 707/1, 2, 3, 4, 707/5, 7, 8, 9, 10, 200, 201, 205, 101, 102, 103

(56) References Cited

U.S. PATENT DOCUMENTS

| 4,435,762 A | | 3/1984 | Milligan et al. |
| 5,159,671 A | | 10/1992 | Iwami |
| 5,404,487 A | | 4/1995 | Murata et al. |
| 5,758,125 A | | 5/1998 | Misinai et al. |
| 5,983,317 A | * | 11/1999 | Kanda et al. ................ 711/112 |
| 6,513,048 B1 | * | 1/2003 | Engle et al. ................. 707/200 |

FOREIGN PATENT DOCUMENTS

| EP | 95300673.1 | 2/1995 |
| JP | 56087377 | 5/1981 |
| JP | 02279265 | 10/1990 |
| JP | 07329141 | 12/1995 |
| JP | 09248585 | 9/1997 |
| WO | WO 93/12487 | 6/1993 |
| WO | WO 95/22865 | 8/1995 |
| WO | WO 98/20647 | 5/1998 |

OTHER PUBLICATIONS

Montague, Robert M. et al., "Virtualizing the San—A New Link Emerges in the San Value Chain", Morgan Keegan & Company—Equity Research, pp 1–19 (Jul. 5, 2000).

* cited by examiner

Primary Examiner—Shahid Alam
Assistant Examiner—Isaac Woo
(74) Attorney, Agent, or Firm—Wilmer Cutler Pickering Hale and Dorr LLP

(57) ABSTRACT

Systems and methods of servicing requests of a first file system communicated in accordance with a first storage protocol using a storage system that is responsive to requests communicated according to a second storage protocol and that is organized in accordance with a second file system. Among other things, this allows the use of potentially more reliable and robust storage systems for holding information of the first file system and allows potentially more reliable and robust management tools to manage the information of the first file system.

26 Claims, 6 Drawing Sheets

METHOD AND APPARATUS FOR IMPLEMENTING A RELIABLE OPEN FILE SYSTEM

CROSS REFERENCE TO RELATED APPLICATIONS

This application is related to the following applications, all of which were filed on Jun. 28, 2000, all of which are assigned to the assignee of this applicatios, and all of which are incorporated by reference in their entirety:

I/O System Supporting Extended Functions and Methods Therefor (U.S. patent application Ser. No. 09/605,493) now patented U.S. Pat. No. 6,636,908;

Clustering System and Method (U.S. patent application Ser. No. 09/605,182); and

Device, System, and Method of Intelligently Splitting Information in an I/O System (U.S. patent application Ser. No. 09/605,438) now patented U.S. Pat. No. 6,735,636.

BACKGROUND

1. Field of the Invention

The present invention relates to a system and method that stores data for non-mainframe file systems on mainframe storage systems and that allows such data to be accessed by mainframe or non-mainframe file systems and connectivity.

2. Discussion of Related Art

The projected growth of storage for the coming years is staggering. Most of the growth is expected to be in "open systems" architectures and devices. Open systems storage, however, is considered to have certain shortcomings, concerning (a) disk reliability, (b) the robustness and richness of data management software, (c) data management functionality, (d) system reliability, and (e) performance. On the other hand, mainframe storage systems are believed to address the above concerns favorably.

Open systems maintain data on open system disks using open system file systems like NTFS or UNIX (SUN/ Solaris). Open system access their data using SCSI or fibre channel (FC) connectivity. Typically, servers access storage by specifying a device number a sector number and number of sectors to read/write. Each sector is typically 512 bytes. Typical file systems include a file directory table and a disk free space table along with other forms of "meta data" (i.e., information about the files themselves in contrast to the file's data). Each file has an entry in the file directory table that specifies the file's name and the physical locations where the file's data is stored. Typically, the physical locations are specified as a set of fixed-sized sectors (a cluster in NTFS terminology). The disk free space table specifies physical locations of free sectors or clusters, i.e., areas of storage that are currently free to be used by the file system.

Mainframes maintain their data on mainframe storage systems using file systems like PS and VSAM. Mainframes manage their file systems through tools like SMS, HSM, and DFDSS. Mainframes access their data using ESCON connectivity. Mainframes typically organize storage as tracks (e.g., a complete circular section of a disk), cylinders (e.g., 15 stacked tracks corresponding to 15 stacked disk plates), and blocks, which can vary in size from as little as about 12 bytes to as large as about 56 kilobytes. Typical file systems include a file directory table and a disk free space table along with other forms of "meta data." Each file has an entry in the file directory table (e.g., VTOC) that specifies the file's name and the physical locations where the file's data is stored. Typically, the physical locations are specified as blocks in tracks, or more specifically, by the cylinder, block, and head numbers. Each block may be arranged in CKD form, which specifies the count, key, and data. The disk free space table specifies free tracks of mainframe disks.

SUMMARY

The present invention provides systems and methods of servicing requests of a first file system communicated in accordance with a first storage protocol using a storage system that is responsive to requests communicated according to a second storage protocol and that is organized in accordance with a second file system. Among other things, this allows the use of potentially more reliable and robust storage systems for holding information of the first file system and allows potentially more reliable and robust management tools to manage the information of the first file system.

According to one aspect of the invention, a first portion of the storage system is allocated to hold data of the first file system. The first portion includes a set of locations for holding directory information of the first file system. A second portion of the storage system is allocated to hold data for the second file system. The second portion includes a set of locations for holding directory information of the second file system, including a set of file information entries corresponding to files of the first file system. Requests of the first file system are intercepted, and the intercepted requests are converted to corresponding requests in the second storage protocol. The conversion includes converting addressing information in the intercepted requests to addressing information in accordance with the second storage protocol. The converted requests are provided to the storage system so that the storage system may service the request. The intercepted requests are analyzed to determine if the requests are updating the set of locations holding directory information of the first file system. If so, corresponding update requests are constructed to update a corresponding file information entry in the second portion. In this fashion, the second portion includes entries that are consistent with the information in the first portion.

DETAILED DESCRIPTION

Preferred embodiments maintain files on mainframe storage and allow access to the files by both mainframe file systems and open system file systems over, respectively, mainframe connectivity and open systems connectivity. From the perspective of the open system servers (e.g., NT and UNIX machines), the files look and behave like conventional files in an open system file system connected by conventional open systems connectivity. From the perspective of the mainframe systems, the files look and behave like conventional files in a mainframe file system connected by conventional mainframe connectivity. Thus, by using preferred embodiments of the invention, open system files may be stored on mainframe storage systems and disks, yet remain accessible to software executing on the mainframe or open system server. Thus, for example, applications running on the open system server may still use the files, and data management tools running on a mainframe may also access and manage the files.

Figure 1:
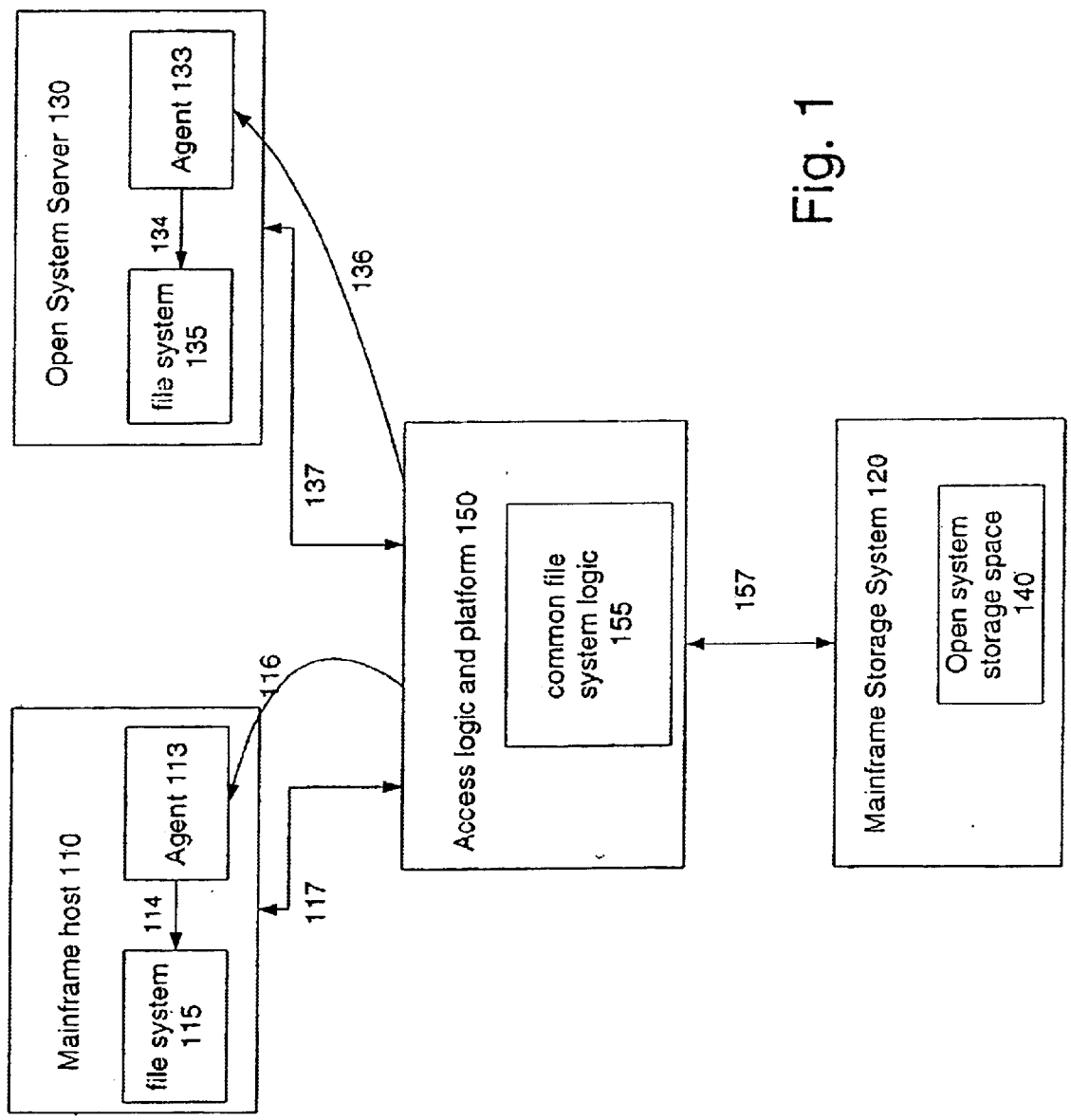
FIG. 1 illustrates the architecture of preferred embodiments.

FIG. 1 illustrates the architecture of preferred embodiments. A mainframe host 110 and an open systems server 130 each communicate with access logic 150, which in turn communicates with conventional mainframe storage 120 (which can be a conventional disk system, control unit, or the like). The mainframe storage holds file data and meta data for the mainframe file system 115 and the file data and meta data for the open system file system. Specifically, a portion 140 of the mainframe storage 120 is allocated to hold the file data and the file system meta data of the open system file system 135.

Under preferred embodiments, the mainframe 110 and open system server 130 access files using their conventional, respective file system logic 115, 135 and using their conventional forms of physical connectivity 117, 137. In this fashion, access to the files is seamless. As stated above, the mainframe host 110 may use PS file system logic 115, and the open system server 130 may use NTFS or SUN/Solaris for file system logic 135. The mainframe 110 might use ESCON connectivity to access files, and the open systems server 130 might use native SCSI connectivity or SCSI over fibre channel (SCSI/FC) connectivity 137. Under certain embodiments, the access logic 150 will access the mainframe storage 120 with ESCON connectivity 157.

The access logic 150 receives commands and addresses from the mainframe host 110 and the open system server 130 expressed in forms conventional for the respective host and server. The access logic 150 converts the commands and addresses from the open system server 130 to corresponding commands and addresses that the mainframe storage 120 can process. Likewise, the access logic 150 converts command responses and status from the mainframe storage 120 to an appropriate form to send to the open system server 130. The commands and addresses from the mainframe host 110 do not need conversion, though under certain embodiments they may be monitored by the access logic 150.

More specifically, the access logic 150 includes (a) logic to bridge open systems connectivity links (e.g., SCSI or FC) to links used by mainframe storage (e.g., ESCON); (b) logic to map or correlate commands, addresses, and disk formats of open systems to corresponding commands, addresses, and disk formats for mainframe systems; and (c) logic to maintain the meta-data for both the mainframe and open systems disk file systems to facilitate file access by both mainframe systems and open system servers.

Platform for Access Logic

A preferred embodiment of the invention implements the access logic outlined above on a platform described in U.S. patent application Ser. No. 09/605,493, entitled "IO SYSTEM SUPPORTING EXTENDED FUNCTIONS AND METHOD THEREFOR" (filed Jun. 28, 2000) which is hereby incorporated by reference in its entirety. That platform is outlined below for convenience.

Figure 2A:
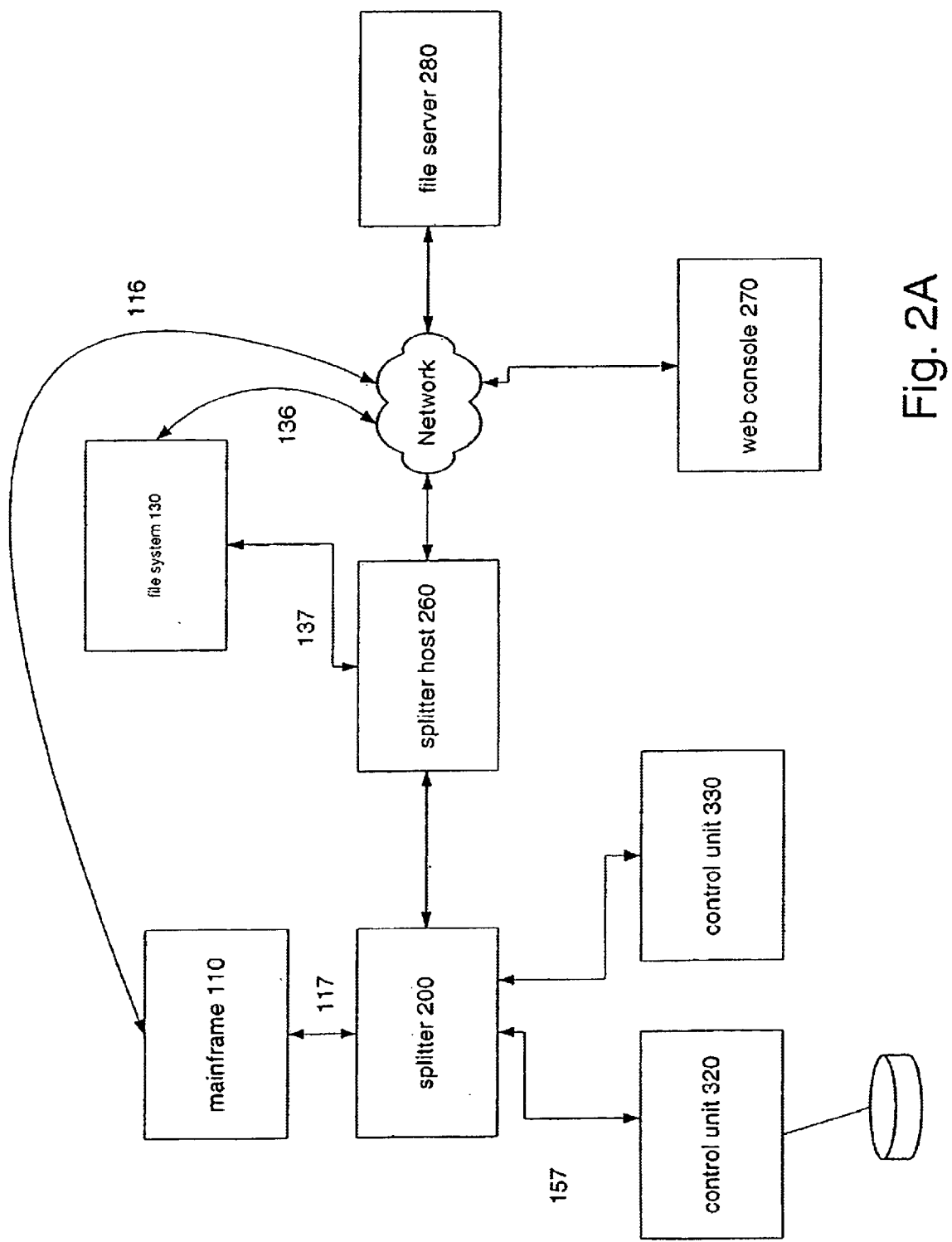
FIGS. 2A–B illustrate the access logic platform according to preferred embodiments of the invention.
Figure 2B:
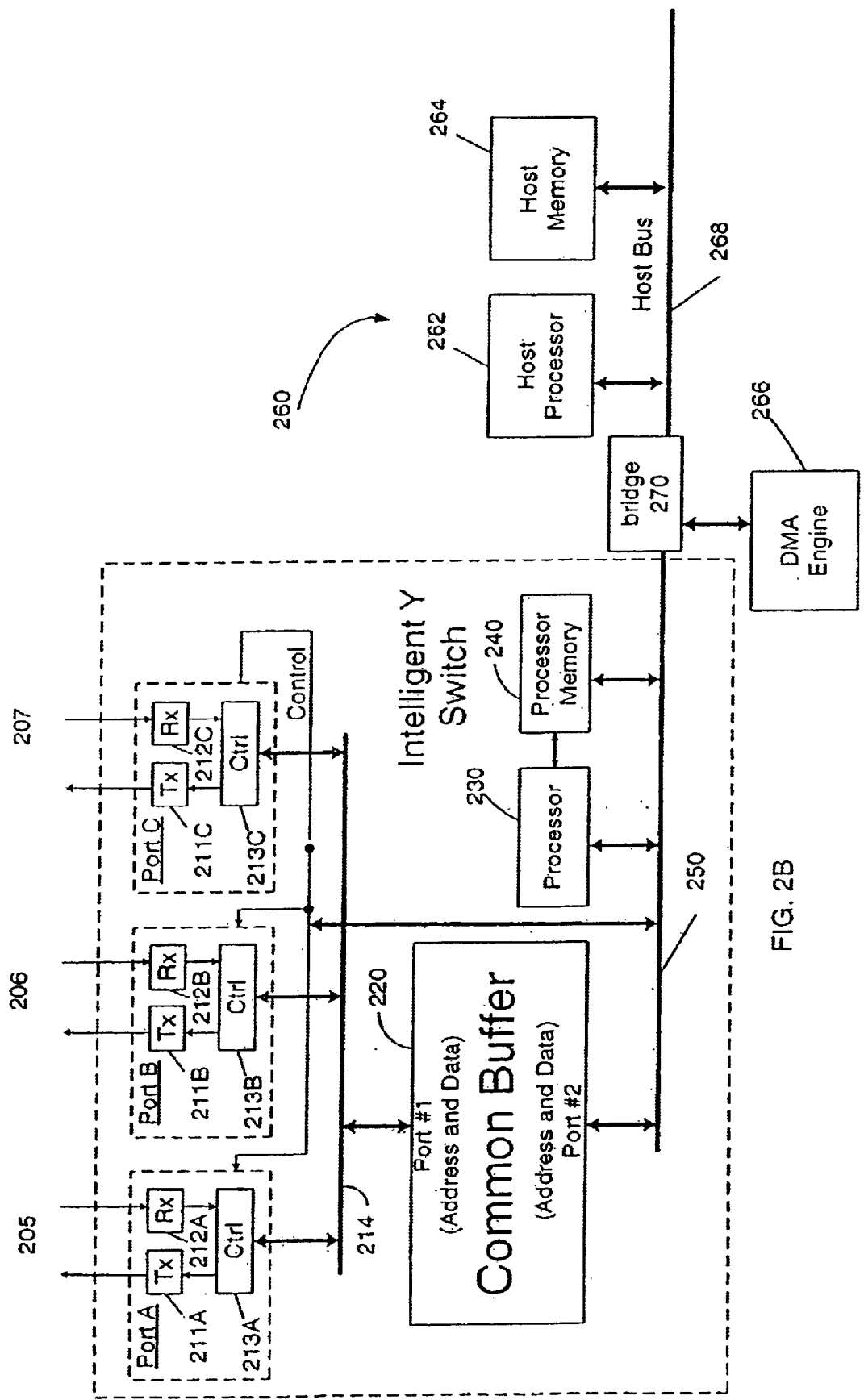

Referring to FIGS. 2A–B and as described in the patent application identified above, the platform includes a host system 260 (as distinguished from a mainframe host) and one or more intelligent splitters 200. Among other things, the host 260 interacts with and may control and configure the various splitters, and it may communicate with open system servers (e.g., server 280) according to open system connectivity links and protocols. The host 260 may also communicate using other communication and storage protocols, e.g., TCP/IP. In this fashion, the host 260 may be made to communicate with "agents" on servers or other computer systems.

Under preferred embodiments, the host 260, under programmatic or user control, can define "sessions" in a splitter 200, which instruct the splitter to detect certain commands and addresses on its links, e.g., 117, and to take specified actions in response thereto. For example, the session may instruct the splitter to (a) detect whether a mainframe link 117 is reading from or writing to certain addresses corresponding to storage locations having file system meta data and (b) inform the host 260 accordingly. Likewise, the session may instruct the splitter to detect when a storage link 157 is returning data and/or status and to inform the host 260 accordingly.

Moreover, under preferred embodiments, the host 260 can cause the splitter 200 to transmit specified channel command words (CCWs) under the ESCON protocol to a particular connectivity link. Thus, for example, the host 260 may create a CCW that would write information to a particular storage location and cause the splitter to send that CCW on a particular link, e.g., 157.

As described more fully in the patent application identified above, each intelligent splitter 200 is a multiport programmable device. The splitter can monitor the various ports and detect the commands and addresses flowing through it. Moreover, the splitter can retransmit IO streams received by it on one or more ports, respond to IO streams received by it, alter the received IO stream (either in a control or data portion) and transmit the altered stream, or invoke the host 260 in response to a received IO stream. All of the above may be the result of a specific session definition and/or in response to instructions from host 260.

The intelligent splitter 200 may communicate with a host system 260 via a bus 268. This communication path may require separate logic 270, for example, to bridge the bus 268 with the local bus 250 of the intelligent splitter. Alternatively, the bridge logic 270 may be integrated into the processor 230 as is known in the art. FIG. 2B illustrates a DMA Engine 266 separately as a convenient descriptive shorthand to show the relevant functionality; this logic may be separate, integrated in bus bridge hardware 270 or provided by the local processor 230.

The path 268 allows a host system to, among other things, read data from, and write data to, the splitter's common buffer 220 and the processor memory 240 either directly or indirectly. In this way, the host 260 may load software for the processor 230 to execute, may establish configuration parameters, and may pass messages to the processor 230. The host processor 262 and memory 264 are part of a complete host system 260 that, among other things, includes non-volatile storage and a network connection(s).

Under a preferred embodiment, the splitter 200 operates on IO streams at a physical address level, and the host 260 is responsible for implementing functionality at a logical level. Under this arrangement, the splitter 200 is configured by the host 260 to take certain actions when IO streams fall within prescribed, physical address domains (e.g., physical volumes, tracks, sectors, and physical blocks). This specification of a physical address domain and associated actions to be performed is a "session definition." The host 260 is a separate computing entity (akin to a file server) that is programmed to understand a logical level of addressing abstraction (e.g., databases, file systems, logical records). It includes logic (discussed more fully below) to map logical-level objects to a corresponding physical address domain.

Figure 3:
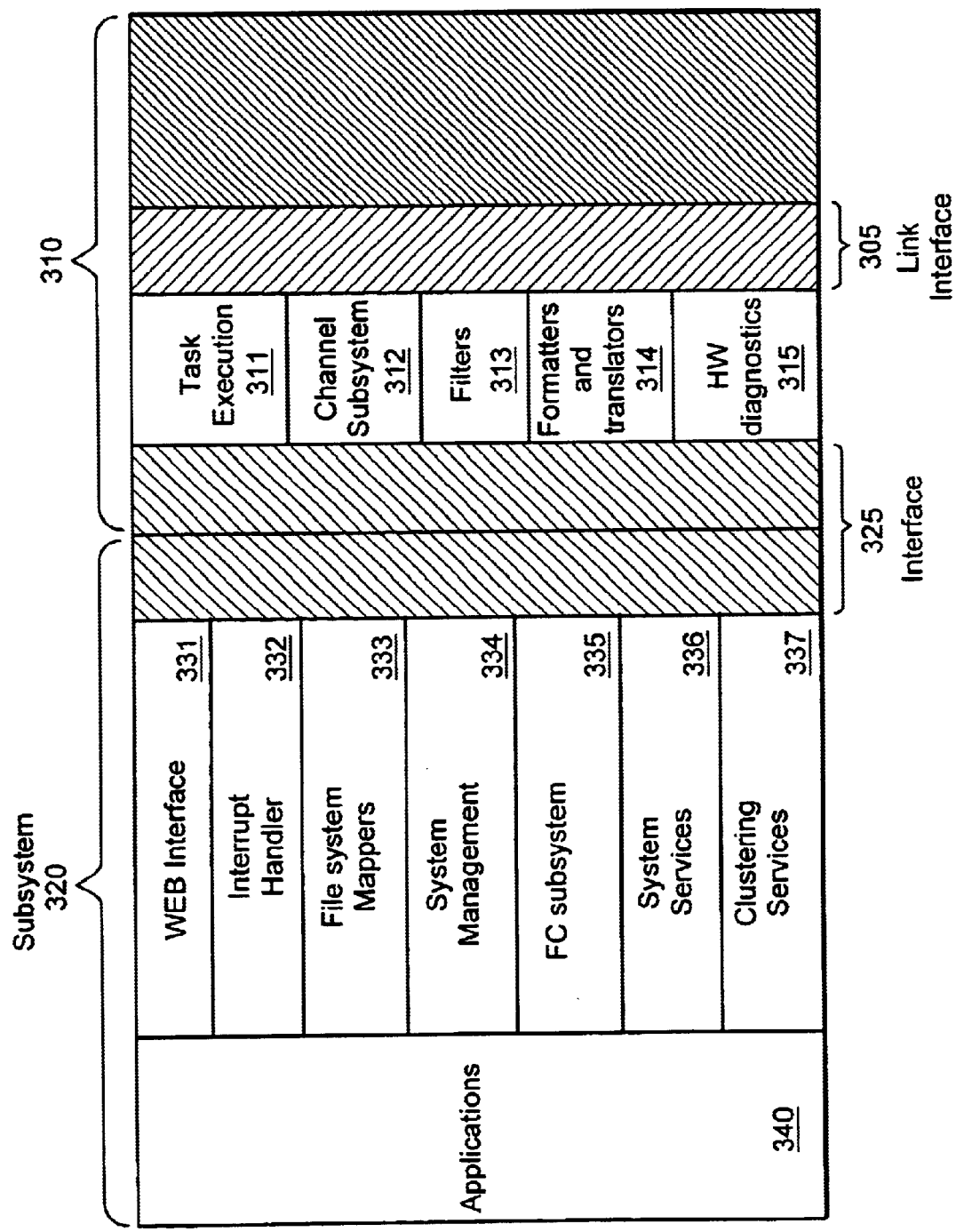
FIG. 3 illustrates the software architecture of the access logic platform according to a preferred embodiment of the invention.

FIG. 3 is a diagram illustrating the software architecture of a preferred embodiment. It includes a link interface 305, an intelligent splitter subsystem 310, a host/splitter interface 325, and a host system 320. It also includes a web server subsystem and an agent module subsystem (not shown).

The link interface (or splitter/port interface) software 305 controls the link hardware of the splitter 200 and is used by the splitter subsystem 310, described below. This interface 305 is used for the transmission and reception of ESCON frames on splitter ports.

The intelligent splitter subsystem software 310 provides data and control access to mainframe storage and other devices connected to one of the ports of a splitter device 200. This subsystem primarily operates at a physical level. It operates in response to one of the following events: (1) a service request from the host 260 through the host/splitter interface 325, (2) indirectly as a result of an interrupt from a splitter port, processed by the link interface; and (3) timer interrupts. The splitter subsystem 310 also includes logic to send CCWs or chains out one of the splitter Ports to mimic the operations that might otherwise result from a mainframe host or a control unit issuing a CCW chain. This logic interacts with a host 260 and includes state machine logic to monitor and control the sending of a CCW or chain to comply with the ESCON protocol.

Host/splitter interface software 325 defines a mechanism for transferring data and control between the host 260 and a splitter 200. Among other things, this interface is used so that the host can convey session definitions to a splitter 200. For example a message may be sent to the splitter to specify (a) the control unit address (b) the device address, and (c) the set of tracks for which a specified action is to be performed. This information may be stored in splitter data structures and later used by the software to determine whether an IO stream received by the splitter falls into a registered domain. The host 260 also sends a message to the intelligent splitter 200 that identifies the logic to execute for the specific subject. The interface software 325 facilitates the control of the splitter's work, shares information between the splitter 200 and the host 260, synchronizes content of corresponding data structures across host/splitter boundaries, and synchronizes execution flow between the tasks executing on a host and the tasks executing on a splitter. Among other things, this interface helps the host 260 configure a splitter 200 and request services from the splitter.

In one embodiment, interface 325 uses messages to provide communication between the host and a splitter. Messages are sent over the bus 268 by a PCI bus driver, and the splitter and host communicate according to a defined splitter interface API. The splitter interface API defines the interface through which applications access the functionality provided by the splitter 200 and splitter subsystem 310. The host software uses routines from the API to communicate with the splitter. The routine sends a corresponding message to a relevant splitter. This routine passes the host's request along with the necessary, corresponding parameters to the splitter. When the splitter 200 completes the processing of the request, the splitter 200 sends a message back with the completion status and possibly with additional data to satisfy the request. Some API routines execute synchronously, meaning that the host routine making the call blocks from further execution until a reply message is received from the splitter. Some API routines operate asynchronously (i.e., non-blocking). In one embodiment, asynchronous routines operate in conjunction with a callback routine that should be invoked when a response message eventually arrives from the splitter. In one embodiment, the interface API provides routines for (1) defining sessions; (2) service requests; (3) breakpoint/notification requests; (4) querying and setting the current state of a splitter; (5) receiving and/or sending data update requests; and (6) resources allocation requests.

The host subsystem 320 includes a web interface component 331, an interrupt handler 332, file system mappers 333, system management 334, a Fibre Channel (FC) subsystem 335, system services 336, and clustering services 337. These components and services in turn may be used by host applications 340 and the other host components to implement data management applications and functions.

The web interface component 331 provides an interface to a web server subsystem 270 that allows a web server to facilitate servicing, managing, and debugging of the system via a remote web-based console.

The interrupt handler 332 handles breakpoints and assists with their dispatching.

The file system mappers 333 include logic to map logical objects into their corresponding physical addresses. These physical addresses may then be used in the construction of session definitions and service requests. In one embodiment, the file system mappers cooperate with agents on other systems. For example an agent may execute on a file server 280 operating under another operating system (e.g., LINUX, NT, Solaris) and this other file server may be effectively merged into the system using the host 260. For example, the file mapper may cooperate with such agents to request physical and logical level information from such file servers (i.e., metadata) or to perform other operating system functions on the host behalf (e.g., open a file on the server). The host may use metadata to implement logical level functions and operations in conjunction with a splitter, e.g., mirroring on a logical level.

System management 334 is responsible for performing administrative functions, e.g., configuring the system, shutting down devices, and the like.

Fibre Channel (FC) subsystem 335 is responsible for communicating with components 290 over a fibre channel protocol.

System services 336 is responsible for providing and interfacing with operating system services.

Clustering services 337 is responsible for arranging hosts 260 and splitters into clustered arrangements to improve connectivity and reliability. (This clustering is not to be confused with mainframe-level clustering described below.)

Applications 340 refers to data management applications that may be executed on the host. For example, the applications identified above described various forms of extended functions that may be implemented on the platform. In the sections that follow, another application to implement the common file system logic is described.

Common File System Logic

Figure 4:
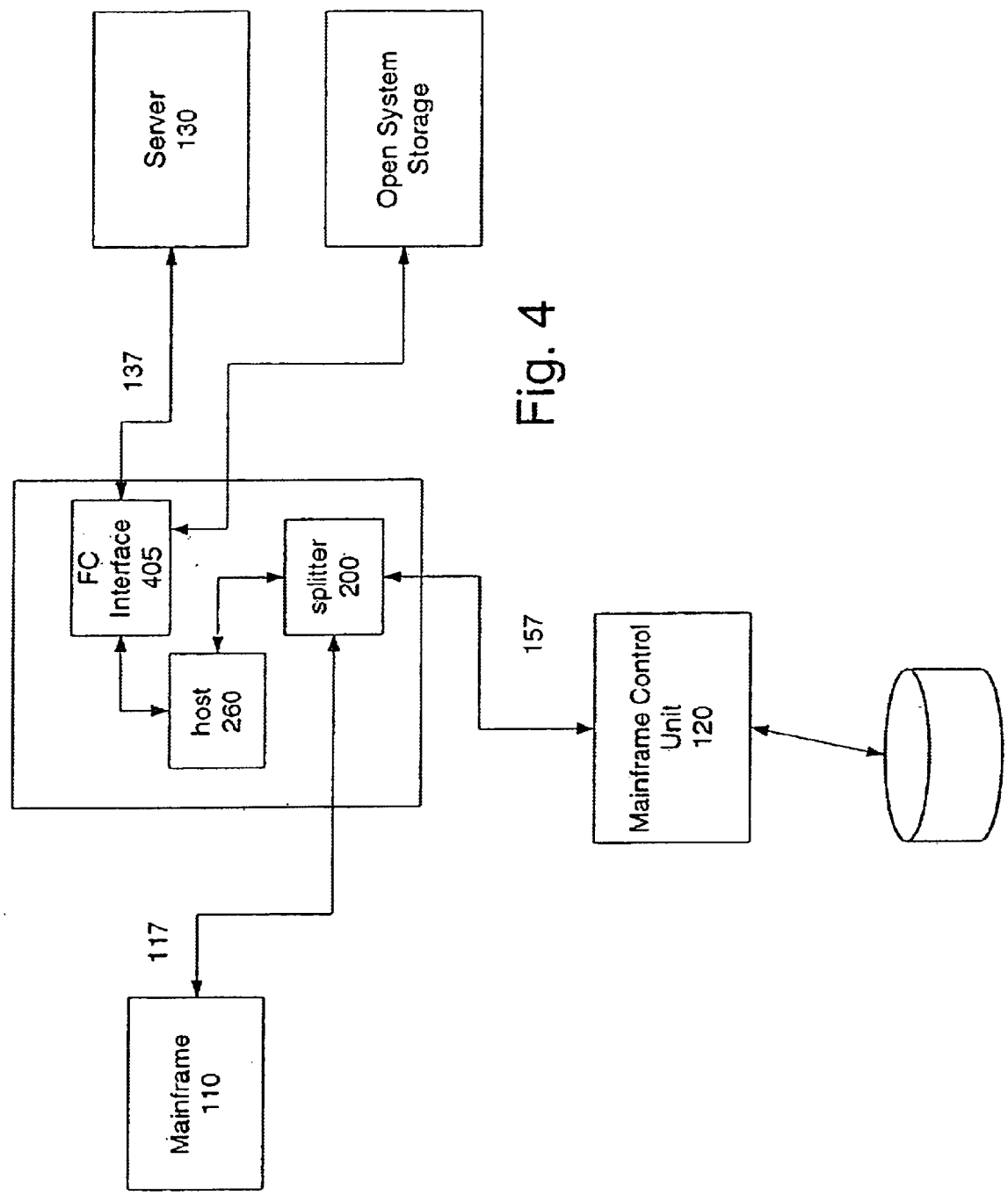
FIG. 4 illustrates a preferred embodiment of the invention using the platform of FIGS. 2A–C.

One embodiment of the invention uses the platform outlined above to implement the access logic 150. Referring to FIG. 4, the platform 150 uses one port on a splitter 200 to handle the ESCON connectivity 117 to the mainframe host 110, another port on the same splitter 200 to handle ESCON connectivity 157 to the mainframe storage 120, and fibre channel interface card 405 (e.g., available from QLogic) in communication with host 260 to handle connectivity 137 to the open system server 130. Not shown in this figure for the sake of simplicity is an IP interface from host 260 and through which the host 260 may communicate with agents 113 and 133 shown in FIG. 1.

Figure 5:
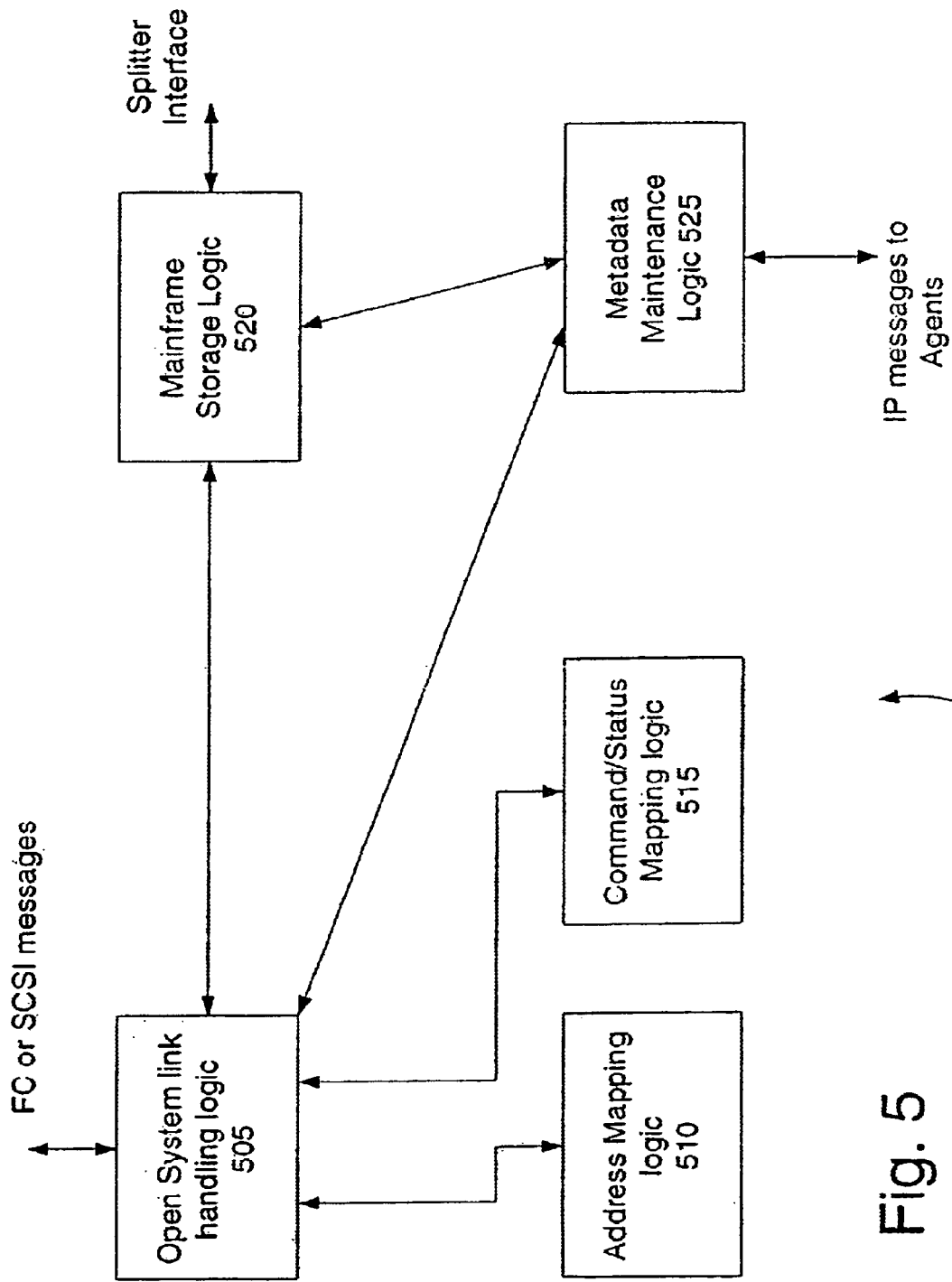
FIG. 5 illustrates the common file system logic according to a preferred embodiment of the invention.

The host 260 software includes common file system logic 155 (see FIGS. 1 and 5) as an application that uses the splitter 200 and splitter software of the access logic platform 150 outlined above. The common file system logic 155 includes open system link handling logic 505; address mapping logic 510; command mapping logic 515; mainframe storage logic 520; and meta data maintenance logic 525.

Open System Link Handling Logic

The link handling logic 505 is primarily responsible for interfacing with the open system connectivity link 137 (e.g., via FC interface cards) and monitoring traffic on such link.

On the reception side, this logic 505 is invoked when new commands and addresses arrive on open system connectivity link. Under one embodiment, the link handling logic 505 then accesses internal data structures (not shown) to determine if the command and address (a) fall within a range that should be processed by mainframe storage 120 or (b) are outside of the above-mentioned range. In the former case, the link handling logic cooperates with the address mapping logic 510 and the command mapping logic 515 to determine corresponding mainframe storage addresses and commands for those open system commands and addresses that are to be processed by the mainframe storage. In the latter case, the command and address (and any other data part of the open system operation) will be forwarded on open system connectivity to open system storage (see FIG. 4); in this case, the open system storage requests are not handled by the mainframe storage 120. In one embodiment, all open system operations arriving on open system connectivity 137 are to be processed by the mainframe storage 120, but in other embodiments, only a subset of the IO space may be so handled, for example, for the applications most needing the reliability and data management offered by the mainframe storage system 120. Once the corresponding mainframe command and address for the storage locations are determined, the information is passed to the mainframe storage logic 520, discussed below, which is responsible for ensuring that the operation is issued to mainframe storage 120. In this way, open system commands and addresses may be transformed or translated to corresponding mainframe storage system commands and addresses.

On the transmission side, the link handling logic 505 receives mainframe data and statuses from the mainframe storage logic 520. The link handling logic 505 then cooperates with the command mapping logic 515 to convert the statuses as appropriate to open system commands. It also causes the converted statuses or data to be sent to the open system server in accordance with the connectivity protocol.

The open system link handling logic 505 can be configured to watch for (or monitor) command and address pairs and to inform other software accordingly in response thereto. In this fashion, and as will be explained more fully below, the link handling logic 505 can detect whether the open system server 130 is attempting to update certain meta data by detecting write commands to addresses used for holding meta data file information. Any writes to such addresses may then be detected and used to inform other software, such as the meta data maintenance logic 525.

Address Mapping Logic

One embodiment of the invention uses algorithmic mapping of open system addresses to mainframe addresses. Under this embodiment, the portion 140 of the mainframe storage 120 that is allocated to hold open system file system data is initially formatted to be organized as fixed physical blocks. That is, even though the mainframe file system logic 115 permits the mainframe storage system to be allocated as variable sized blocks, the file system logic 115 is invoked to organize portion 140 as fixed size blocks. Moreover, the portion 140 is configured so that the block size is the size of one or more sector sizes of the open system organization (i.e., the open system unit of file space allocation is a sector).

As stated above, the open system server will address IO space using a device number and a sector number. The correspondence between the open system device number, e.g., SCSI, and the mainframe system device number may be represented as (Mainframe_dev, offset)=MAP (SCSI_dev)

meaning that the set of mainframe device numbers and offset (in sectors) may be equated to a mapping function with the SCSI device number as a variable. Thus, more than one SCSI device can share the same mainframe device. Moreover, the mapping (i.e., MAP_ may be defined as part of system configuration). Device addresses are as specified by the SCSI and ECKD standards respectively.

Under the above embodiment, this device number and sector number are algorithmically converted into a specific location on mainframe storage, specified as a combination of cylinder number, head number, block number and sequence number (indicating the given sector within a block, if the block is configured to have a size to hold multiple sectors).

For embodiments in which the mainframe storage 120 uses cylinders having 15 heads, the mainframe storage address is determined from the open system address according to the following logic.

Inputs:

SCSI_dev is the SCSI device ID

N is the number of blocks on track (determined based on disk technology used);

M is the number of sectors per block

Outputs:

Sector is the open system sector number specified in an open system read or write operation (in this context Sector and ESCON_dev are output of the MAP function);

ESCON_dev is the mainframe device address;

Offset beginning track of the open systems devices on the mainframe device

S is the sector number as mapped to a mainframe device

C is the mainframe cylinder number where a sector S resides

H is the mainframe disk head number (assume there are 15 heads all together) through which sector S will be read/written R is the mainframe block number on the track where sector S resides I is the mainframe sequence number of sector S in block R (this is used if the block holds more than one sector)

Since the number of sectors on cylinder is N*M*15 (assuming that there are 15 heads in a cylinder) then (ESCON_dev, offset)=MAP (SCSI_dev)

$S$=Sector+offset $C$=floor($S/(N*M*15)$)

$H$=floor($(S-C*N*M*15)/(N*M)$)

$R$=floor($(S-C*N*M*15-H*N*M)$)

$I$=$S-C*N*M*15-H*N*M-R*M$

"Floor" is the operand truncating a number to the lower integer value.

Command Mapping Logic

As outlined above, the command mapping logic 515 can map an open system command(s) to a corresponding mainframe command(s) and vice versa. For example, one embodiment maps SCSI control commands to the corresponding CCW control commands. SCSI control commands which have no meaning in the mainframe disk domain will be intercepted and blocked from passing to the mainframe storage, i.e., translating those commands into "no operations" or "no-ops". In these instances, the link handling logic 505 will return appropriate status to the open system server so that the server will believe that the operation executed correctly. Analogously, SCSI read or write commands are mapped to corresponding mainframe commands. In some instance, one open system command may require several "sub" commands as part of a CCW chain, and in this sense it may be easier to think of the mapping as between open system commands and the operations contained in CCWs to mainframe storage 120.

Responses and statuses from the mainframe storage 120 need to be converted into an appropriate form for the open system 130 as outlined above. For example, an "end of chain Channel end device end" is translated to good SCSI status. A unit check status is translated to check condition SCSI status. A status modifier is translated to condition met SCSI status. A device busy or control unit busy status is translated to busy SCSI status. All other ESCON status codes will be internally handled by the bridging apparatus in a way similar to a mainframe handling of these statuses.

Alternative embodiments that support SCSI over FC connectivity operate analogously.

Mainframe Storage Logic

The mainframe storage logic 520 is primarily responsible for interfacing with the splitter software outlined above. More specifically, the mainframe storage logic 520 receives commands and addresses from the link handling logic, and in response constructs CCWs and causes the splitter 200 to issue the CCWs. Among other things, this logic may need to establish breakpoints to monitor the status of CCW operations. On the reception side, this logic 520 receives CCWs and other responses from the mainframe storage 120, via the splitter 200, and sends the corresponding information to the link handling logic 505.

The mainframe storage logic 520 of certain embodiments is responsible for defining sessions in the splitter 200 to cause the splitter to monitor the IO stream from the mainframe to detect whether relevant meta data (more below) is being updated by the mainframe 110. If so, the splitter 200 will inform the mainframe storage logic 520, for example, via a breakpoint, which in turn will inform the meta data maintenance logic 525 accordingly.

Meta Data Maintenance Logic

The purpose of the meta data maintenance logic 525 is to ensure that the mainframe 110 and the open system 130 have consistent images of the open system files stored on the mainframe storage. In this fashion, the mainframe 110 can, if desired, operate on the open system files stored on the mainframe storage 120 using mainframe data management tools, or the like in a file-specific way. Certain embodiments of the invention can receive the reliability benefit of mainframe storage without the meta data maintenance logic, but the mainframe tools cannot operate on such data at a file-level of operation. Instead, under these embodiments, the tools would have to treat the open system files as one mainframe file corresponding to the entire reserved portion 140.

In one embodiment, the mainframe 110 is expected to only operate passively on the open system files, meaning that the mainframe will not delete or alter the contents of the open system files. The mainframe file system 115 defines the data within portion 140 like ordinary mainframe files (more below). Thus, if an open system files within portion 140 is called "X.doc" then the mainframe file system's meta data also reflects that there is a file at the identical location called "X.doc" or at least something that has a correspondency thereto. Note, for Unix-like file systems the file name reflects the complete path of the file. For NTFS, the filename includes the device letter on which the file resides. Likewise, the IO locations within 140 that hold meta data for the open system will likewise be reflected as files manageable by the mainframe file system 115.

In this one embodiment, the meta data maintenance logic 525 is responsible for ensuring in real time that the mainframe's meta data image of portion 140 is consistent with the open system's image. To such end, the link handling logic 505 is configured to detect writes to the locations corresponding to the open system's file system's meta data. For example, these locations may be written to write an entry in the file directory table to create a file or to clear an entry to delete file. The locations may also be written to update the free space table if a file is being created or changed in size. The open system's meta data will be updated consistently with the logic of the open system's file system logic 135, but the same types of changes need to be reflected in the meta data used by the mainframe file system logic 115, if the meta data is to be kept consistent so that mainframe tools and software can operate on the open system files. If the link handling logic 505 detects such an update, it informs the meta data logic 525 accordingly.

In one sub-embodiment, the meta data logic 525, in response to being informed of an update to the open system meta data image, communicate via TCP connectivity 116 with an agent 113 on the mainframe 110 to inform it of the update. The agent then, acting as a client to the mainframe file system logic 115, informs the file logic accordingly. For example, if the open system file system 135 is updating a file directory with a new entry to correspond to a new file being created, the meta data logic 525 will be informed of the update to the locations and will look into the data stream to determine what information is being placed in the open systems file system file directory. This information is conveyed to the agent 113 which then constructs a request to the mainframe file system 115 requesting that a file be created with similar information to create file X at mainframe address A (where A maps exactly to the sector addresses where the open system understands the data to be). Routines update the VTOC and free space tables accordingly.

In another implementation, the open system agent 133 can pass directly to mainframe agent the filename+file location information whenever a new file is created, deleted or resized. The mainframe agent 113 will then create the mainframe directory entries, bypassing the need to intercept SCSI commands all together.

Under an alternative sub-embodiment, the meta data logic 525 may be made to cooperate with the mainframe storage logic to write the corresponding information into the appropriate file structures (e.g., VTOC) on the mainframe storage 120 directly.

In yet another implementation, the open system file system meta data (names and locations) will be passed to the mainframe in offline as opposed to real time. In this implementation, the mainframe meta data is created only when the file system is to be backed up by the mainframe for example. In such a case, the mainframe meta data is not needed until the files are to be accessed the mainframe backup. In this case, either the open system agent 133, or the common file system logic 155 will traverse the open system meta data and using one of the methods described above create the corresponding mainframe meta data.

In yet another implementation the mainframe meta data will be created off line as explained above in conjunction with creating a snapshot of the open system file system to another disk first. For example, once a snapshot copy has been made of the open system's file system's meta data, that snapshot copy may then be scanned and used to update the corresponding meta data maintained by the mainframe for the open system files. In this way, the mainframe system (and its corresponding data management tools) may not have a view of the open systems meta data that is consistent with that of the open system in real time, but it will have it when the view needs to be consistent, e.g., before the mainframe tools act on the open system files stored on mainframe storage.

For certain open system file systems there may be inconsistencies in formats between mainframe file names and open system file names. For example, mainframes may support only upper case character set for filenames, or there may be some limitation on the length of mainframe file names that differs from open system file system. One embodiment addresses these limitations by maintaining additional name conversion tables (not shown) as meta data (stored on corresponding disk storage) accessed by the common file system logic but hidden from either the open system file system or the mainframe file system. Each entry in this table includes an open system file name, and it's corresponding mainframe name as it appears in mainframe directory table.

The sector addresses and the mainframe addresses used to hold specific, relevant meta data may be determined in an operating system and file system dependent way.

Depending on the file system used by the mainframe or the opens system, various forms of meta data information may be included by the file directory tables and disk free space tables and other tables. This additional information is maintained as appropriate in the meta data images but it may not be necessary to "trap" on it, as outlined above.

Basic File Operations

The following sections describe basic file operations to illustrate the interaction of the various pieces of logic.

Initial Disk Formatting

The portion 140 of the mainframe storage is formatted as fixed size blocks in which each block has a size equal to some integral number of sectors of the open system file system. The open system file system 135 then executes its logic to allocate and initialize its directory table and free space table. This is done through normal read and write operations that are mapped as outlined above to update the locations in mainframe storage 120. In certain embodiments, the open system agent 133 returns to the mainframe agent 113 the location and sizes of these tables. Space is also allocated for the meta data tables of the mainframe.

File Creation

To create a file, the open system file server 135 allocates disk space and creates the file by regularly issuing SCSI commands to update the meta-date tables. These SCSI commands are intercepted as outlined above and mapped to CCW commands and issued to the mainframe disk. Any updates to meta data files are recognized as such and the meta data logic 525, which will look into the data stream to identify relevant information and use that information to inform and update the mainframe meta data as well.

File Deletion

To delete a file, the open system file server issues SCSI commands to update the meta-data tables by removing the file name from the file directory table, and returning space to the disk free space table by marking the space used for the file's data as now free.

Similar to file creation, SCSI commands are intercepted and mapped to CCW commands and issued to the mainframe disk to update the open system's image of the meta data. The platform will recognize, based on the target address of the SCSI commands, that the update is to the meta-data files and it will look in the data portion of the commands to identify the file's name and the disk locations allocated for the file. Again, the platform will update the mainframe meta-data tables accordingly.

File Resizing

To resize a file, the file server issues SCSI commands to update the meta data tables accordingly. The same type of remapping is done here as outlined above.

File reads/writes

To service reads and writes from the open system server, the file server issues a read or write SCSI command. The platform translates the disk addresses in the SCSI commands and issues a corresponding CCW chain to the mainframe disk. For write commands, the platform will convert any received status and send it to the open system. For read commands, the platform will relay any received data and send it to the open system along with converted statuses.

Allocating Storage

Certain embodiments of the invention cause the Open System file system 135 to use a cluster size that corresponds to an intergral number of tracks. Since space is allocated in the mainframe storage system 120 in units of tracks, causing the open system file system to fix cluster size to a number of sectors that fits into an integral number of tracks uses storage resources efficiently.

Alternative Embodiments

In another implementation extraction of data from the open system file system meta-data can be accomplish by modifying the appropriate create file, delete file and resize file routines, and passing the relevant information to the bridging apparatus using TCP/IP, as opposed to monitoring IO addresses.

In another implementation the mainframe file system meta-data is updated by an mainframe resident agent after receiving the appropriate information from the bridging apparatus using TCP/IP.

In another embodiment, addresses between the first and second file systems may be related by the use of look-up tables or equivalent data structures, in contrast to the use of algoritmic mapping.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. A method of servicing requests of a first file system communicated in accordance with a first storage protocol using a storage system that is responsive to requests communicated according to a second storage protocol and that is organized in accordance with a second file system, the method comprising the acts of:

allocating a first portion of the storage system to hold data of the first file system, the first portion including a set of locations for holding directory information of the first file system;

allocating a second portion of the storage system to hold data for the second file system, the second portion including a set of locations for holding directory information of the second file system, wherein the directory information of the second file system includes a set of file information entries corresponding to files of the first file system;

intercepting requests of the first file system and converting the intercepted requests to corresponding requests in the second storage protocol, including converting addressing information in the intercepted requests to addressing information in accordance with the second storage protocol;

providing the converted request to the storage system so that the storage system may service the request;

analyzing the intercepted requests to determine if the requests are updating the set of locations holding directory information of the first file system and if so constructing corresponding update requests to a corresponding file information entry in the second portion, so that the second portion includes entries that are consistent with the information in the first portion.

2. The method of claim 1 wherein the first file system is an open system file system and wherein the second file system is a mainframe file system.

3. The method of claim 1 wherein the first storage system protocol is SCSI and wherein the second storage system protocol is ESCON.

4. The method of claim 1 wherein storage is allocated for the first portion to create an algorithmic relationship of addresses of the first file system to addresses of the second file system.

5. The method of claim 4 wherein the addresses of the first file system are based on fixed-size sector numbers and wherein the addresses of the second file system are based on a cylinder number, disk head number, and a block number, wherein the second file system permits block size to vary.

6. The method of claim 5 wherein the second file system allocates storage organized as tracks having blocks of a fixed size and wherein the first file system is caused to allocate storage as a cluster of sectors, wherein the cluster fits into an integral number of tracks.

7. The method of claim 1 wherein the requests of the first file system are intercepted by a bridging apparatus in communication with the storage system and wherein the bridging apparatus constructs the update requests to a corresponding file information entry in the second portion.

8. The method of claim 1 wherein the requests of the first file system are intercepted by a bridging apparatus in communication with the storage system and wherein the bridging apparatus communicates with an agent that constructs the update requests to a corresponding file information entry in the second portion.

9. The method of claim 1 wherein the directory information of the first file system manages files organized according to an i-node based file structure and wherein the second directory information is a volume table of contents (VTOC) structure.

10. The method of claim 1 wherein the set of file information entries corresponding to files of the first file system include filename entries and wherein the filename entries have an algorithmic relationship to filenames used by the first file system.

11. The method of claim 1 wherein the set of file information entries corresponding to files of the first file system include filename entries having a mapped correspondency to filenames used by the first file system.

12. A system for handling requests from a first file system communicated in accordance with a first storage protocol using a storage system that is responsive to requests communicated according to a second storage protocol and that is organized in accordance with a second file system, wherein a first portion of the storage system is allocated to hold data of the first file system, the first portion including a set of locations for holding directory information of the first file system, and wherein a second portion of the storage system is allocated to hold data for the second file system, the second portion including a set of locations for holding directory information of the second file system, and wherein the directory information of the second file system includes a set of file information entries corresponding to files of the first file system, the system comprising:

logic to intercept requests of the first file system;

logic to convert the intercepted requests to corresponding requests in the second storage protocol, including converting addressing information in the intercepted requests to addressing information in accordance with the second storage protocol;

logic to issue the converted request to the storage system;

logic to analyze the intercepted requests to determine if the requests are updating the set of locations holding directory information of the first file system;

logic, responsive to the logic to analyze, to construct update requests to a corresponding file information entry in the second portion, so that the second portion includes entries that are consistent with the information in the first portion.

13. The system of claim 12 wherein the first file system is an open system file system and wherein the second file system is a mainframe file system.

14. The system of claim 12 wherein the first storage system protocol is SCSI and wherein the second storage system protocol is ESCON.

15. The system of claim 12 wherein the logic to convert includes logic to convert addresses based on an algortimic mapping of addresses of the first file system to addresses of the second file system.

16. The system of claim 15 wherein the addresses of the first file system are based on fixed-size sector numbers and wherein the addresses of the second file system are based on a cylinder number, disk head number, and a block number, wherein the second file system permits block size to vary.

17. The system of claim 16 wherein the second file system allocates storage organized as tracks having blocks of a fixed size and wherein the first file system is caused to allocate storage as a cluster of sectors, wherein the cluster fits into an integral number of tracks.

18. The system of claim 12 wherein the logic to intercept, the logic to convert, the logic to issue and the logic to analyze are provided on a bridging apparatus in communication with the first file system and with the storage system.

19. The system of claim 18 wherein the logic to construct update requests is provided on the bridging apparatus.

20. The system of claim 18 wherein the logic to construct update requests is provided by agent logic in communication with the second file system.

21. The system of claim 12 wherein the directory information of the first file system manages files organized according to an i-node based file structure and wherein the second directory information is a volume table of contents (VTOC) structure.

22. The system of claim 12 wherein the set of file information entries corresponding to files of the first file system include filename entries and wherein the filename entries have an algorithmic relationship to filenames used by the first file system.

23. A method of managing and maintaining information of a first file system communicated in accordance with a first storage protocol using a storage system that is responsive to requests communicated according to a second storage protocol and that is organized in accordance with a second file system, the method comprising the acts of:

allocating a first portion of the storage system to hold data of the first file system, the first portion including a set of locations for holding directory information of the first file system;

allocating a second portion of the storage system to hold data for the second file system, the second portion including a set of locations for holding directory information of the second file system, wherein the directory information of the second file system includes a set of file information entries corresponding to files of the first file system;

converting requests of the first file system to corresponding requests in the second storage protocol, including converting addressing information in the intercepted requests to addressing information in accordance with the second storage protocol;

providing the converted request to the storage system so that the storage system may service the request;

analyzing the information at the set of locations of the first file system and creating and storing corresponding information in the set of file information entries of the second file system corresponding to files of the first file system; and at specified times using a data management tool of the second file system to manage files in the first portion of storage by accessing the the set of file information entries of the second file system corresponding to files of the first file system to locate the files of the first file system.

24. The method of claim 23 further comprising the act of creating a snapshot copy of the information at the set of locations of the first file system and wherein the analyzing act is performed by analyzing the snapshot copy.

25. A system for managing and maintaining information of a first file system communicated in accordance with a first storage protocol using a storage system that is responsive to requests communicated according to a second storage protocol and that is organized in accordance with a second file system, wherein a first portion of the storage system is allocated to hold data of the first file system, the first portion including a set of locations for holding directory information of the first file system, and wherein a second portion of the storage system is allocated to hold data for the second file system, the second portion including a set of locations for holding directory information of the second file system, and wherein the directory information of the second file system includes a set of file information entries corresponding to files of the first file system, the system comprising:

logic to convert requests of the first file system to corresponding requests in the second storage protocol, including converting addressing information in the intercepted requests to addressing information in accordance with the second storage protocol;

logic to provide the converted request to the storage system so that the storage system may service the request;

logic to analyze the information at the set of locations of the first file system and to create and store corresponding information in the set of file information entries of the second file system corresponding to files of the first file system so that at specified times a data management tool of the second file system may be used to manage files in the first portion of storage by accessing the the set of file information entries of the second file system corresponding to files of the first file system to locate the files of the first file system.

26. The system of claim 25 wherein the logic to analyze the information includes logic to analyze a snapshot copy of the information at the set of locations of the first file system.

* * * * *